United States Patent
Maret et al.

(10) Patent No.: US 9,719,373 B2
(45) Date of Patent: Aug. 1, 2017

(54) SLOTTED DISTRIBUTION SLEEVE FOR A SEAL PLATE

(71) Applicant: UNITED TECHNOLOGIES CORPORATION, Farmington, CT (US)

(72) Inventors: Alexander J. Maret, Middletown, CT (US); James B. Coffin, Windsor, CT (US); Jonathan Logan Miller, Ware, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 456 days.

(21) Appl. No.: 14/459,988

(22) Filed: Aug. 14, 2014

(65) Prior Publication Data

US 2015/0152746 A1    Jun. 4, 2015

Related U.S. Application Data

(60) Provisional application No. 61/911,161, filed on Dec. 3, 2013.

(51) Int. Cl.
| | |
|---|---|
| *F01D 25/18* | (2006.01) |
| *F16J 15/16* | (2006.01) |
| *F16J 15/324* | (2016.01) |
| *F16C 33/66* | (2006.01) |

(52) U.S. Cl.
CPC ......... *F01D 25/186* (2013.01); *F01D 25/183* (2013.01); *F16J 15/162* (2013.01); *F16J 15/324* (2013.01); *F05D 2260/98* (2013.01); *F16C 33/6677* (2013.01)

(58) Field of Classification Search
CPC ...... F01D 25/18; F01D 25/183; F01D 25/186; F01D 25/20; F05D 2260/98; F16C 33/6677; F16J 15/162; F16J 15/324; F16J 15/3404; F16J 15/3408; F16J 15/3412; F16J 15/3416; F16J 15/342
USPC ......... 184/6.11; 384/473, 474, 475; 277/422
See application file for complete search history.

(56) References Cited

U.S. PATENT DOCUMENTS

| | | | | |
|---|---|---|---|---|
| 2006/0062504 A1* | 3/2006 | Wilton | .................... | F01D 25/18 384/475 |
| 2013/0004109 A1* | 1/2013 | Metzger | .................. | F16C 33/58 384/473 |
| 2016/0010477 A1* | 1/2016 | Maret | .................. | F16J 15/3404 277/408 |

* cited by examiner

*Primary Examiner* — Christopher Verdier
(74) *Attorney, Agent, or Firm* — Cantor Colburn LLP

(57) ABSTRACT

A seal assembly for a gas turbine engine, may be manufactured in two pieces, the first piece is a seal plate with a cavity around its inner wall and the second piece is a sleeve that mounts in the cavity of the seal plate. The sleeve may have oil distribution channels that deliver oil to subsequent components and apertures that deliver oil to the seal plate. The volume of oil delivered to the seal plate can be set by the number of apertures and related radial holes in the sleeve. Because the sleeve delivers oil through the apertures and radial holes to an annulus in the cavity of the seal plate, cooling bores in the seal plate need only be drilled into the annulus and the number of cooling bores can be independent of the number of radial holes in the sleeve.

18 Claims, 5 Drawing Sheets

SLOTTED DISTRIBUTION SLEEVE FOR A SEAL PLATE

CROSS-REFERENCE TO RELATED APPLICATION

This Application is a non-provisional patent application claiming priority under 35 U.S.C. §119(e) to US Provisional Patent Application Ser. No. 61/911,161 filed on Dec. 3, 2013.

FIELD OF THE DISCLOSURE

The subject matter of the present disclosure generally relates to gas turbine engines. More particularly, the subject matter of the current disclosure relates to a two-piece seal plate of a gas turbine engine.

BACKGROUND OF THE DISCLOSURE

Seal plates in gear assemblies or elsewhere in gas turbine engines have numerous functions. First, seal plates act as a seal between a shaft and bearing, for example, in a bull gear. Seal plates can also act to distribute oil thrown outward during rotation of the shaft for both cooling and lubrication. In some cases, a seal plate has an annulus connected to slots to allow oil to pool and be distributed in different proportions to components coupled to the seal plate. Lastly, the seal stands inline in the engine component stack as one of the load bearing elements in the stack.

However, design pressures continue to limit the space available for prior art implementations of seal plates. Many parts simply need to be smaller, which limits the use of prior art oil distribution techniques for many of the following reasons. Smaller components may make the seals more susceptible to uneven thermal expansion when oil cooling passages are widely spaced in some prior embodiments. The need for more even cooling to minimize these expansion effects leads to increased holes and slots in the seal plates for oil flow. This has at least two effects: One, precise manufacturing controls are required for drilling cooling holes through the seal plates into the oil distribution slots of the inner wall of the seal. Two, the increased number of cooling passages and slots reduces the mechanical strength of the seal to bear the loads of the engine component stack.

Further, seals used in different applications may have slightly different requirements for cooling and oil flow distribution. This leads to increased inventory and more customization in the manufacturing processes for different engines.

SUMMARY OF THE DISCLOSURE

In an aspect of the disclosure, a seal assembly for use in a gas turbine engine may include a seal plate and a sleeve. The seal plate may include an inner wall having an annulus formed therein and a plurality of bores between an outer wall of the seal plate and the annulus. The sleeve may be disposed in the annulus of the seal plate. The sleeve may have a cylindrical shape with an inner wall, an outer wall, a front edge, and a rear edge. The sleeve may also have a front annulus around the inner wall adjacent the front edge, a rear annulus around the inner wall at the rear edge, a dam between the front annulus and the rear annulus formed by a ridge between the front and rear annuli, and a plurality of channels disposed axially in the dam between the front annulus and the rear annulus. The sleeve may also include a plurality of radial holes in the dam and a plurality of apertures disposed axially in the dam from the front annulus to respective radial holes.

In another aspect of the disclosure, a sleeve having a generally cylindrical shape for use in a seal assembly of a gas turbine engine may include an outer surface, an inner surface, a front edge, and a rear edge. The sleeve may be disposed in the seal plate of a seal assembly. The sleeve may also include a front annulus disposed around the inner surface adjacent the front edge, a rear annulus disposed around the inner surface at the rear edge and a dam between the front annulus and the rear annulus formed by a ridge between the front and rear annuli. The sleeve may also have an aperture disposed axially in the dam from the front annulus to a radial hole connecting the slot and the outer surface.

In yet another aspect of the disclosure, a method of distributing oil in a gas turbine engine may include providing a seal plate, disposing a sleeve at an inner wall of the seal plate, the sleeve having an axial oil path and a radial oil path. The method may include rotating the sleeve and the seal plate during operation of the gas turbine engine. The method may include providing oil at an inner wall of the sleeve and moving the oil through the axial oil path to an adjoining component of the gas turbine engine as a result of rotating the sleeve and seal plate. The method may also include moving the oil through the radial oil path of the sleeve to an annulus of the seal plate. The annulus of the seal plate may be located between an outer wall of the sleeve and the inner wall of the seal plate. The method may also include moving oil through a bore disposed between the annulus of the seal plate and an outer wall of the seal plate.

BRIEF DESCRIPTION OF THE DRAWINGS

So that the manner in which the above recited concepts of the present disclosure may be understood in detail, a more particular description is provided by reference to the embodiments which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

Figure 1:
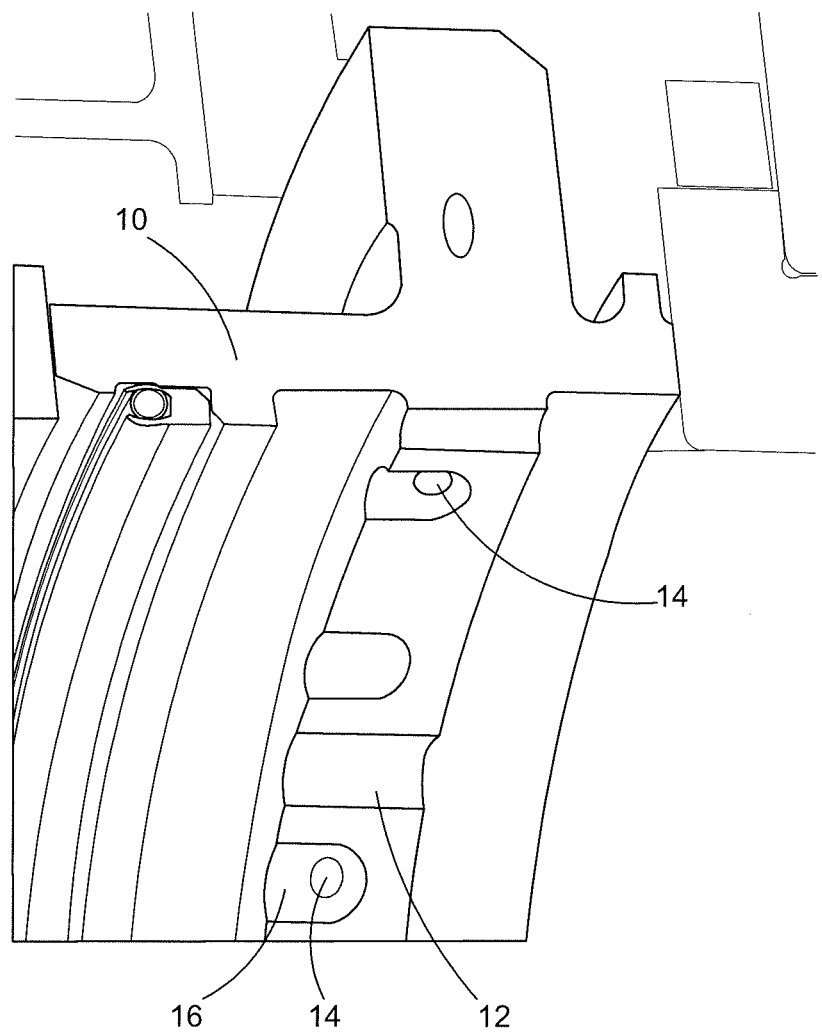
FIG. 1 is a section view of a prior art seal plate.

FIG. 1 is a section view of a prior art seal plate 10. The seal plate 10 may include axial oil passages 12 that direct oil to an adjacent component, such as a bearing (not depicted) and radial holes 14 that direct oil up through the seal plate 10 to cool the seal plate 10. As discussed above, when the spacing between the radial holes 14 are spaced too far apart, the seal plate 10 can heat unevenly causing the seal plate 10 to distort. The number of axial oil passages 12 to radial holes 14 sets the ratio of oil that will be delivered to the bearing versus cooling the seal. Because this ratio may change from application to application, a large number of seal plates must be manufactured to accommodate each different application.

The number of radial holes 14 can be increased to meet cooling and distortion requirements for the seal plate 10. However, when the number of radial holes 14 and their associated apertures 16, are increased, in combination with the axial oil passages 12, the physical integrity of the seal plate 10 can suffer when placed under high loads when the rotating engine stack is assembled or in operation.

Lastly, the process for creating the radial hole 14 requires precise measurements so that when the hole is drilled, it actually contacts the aperture 16.

Figure 2:
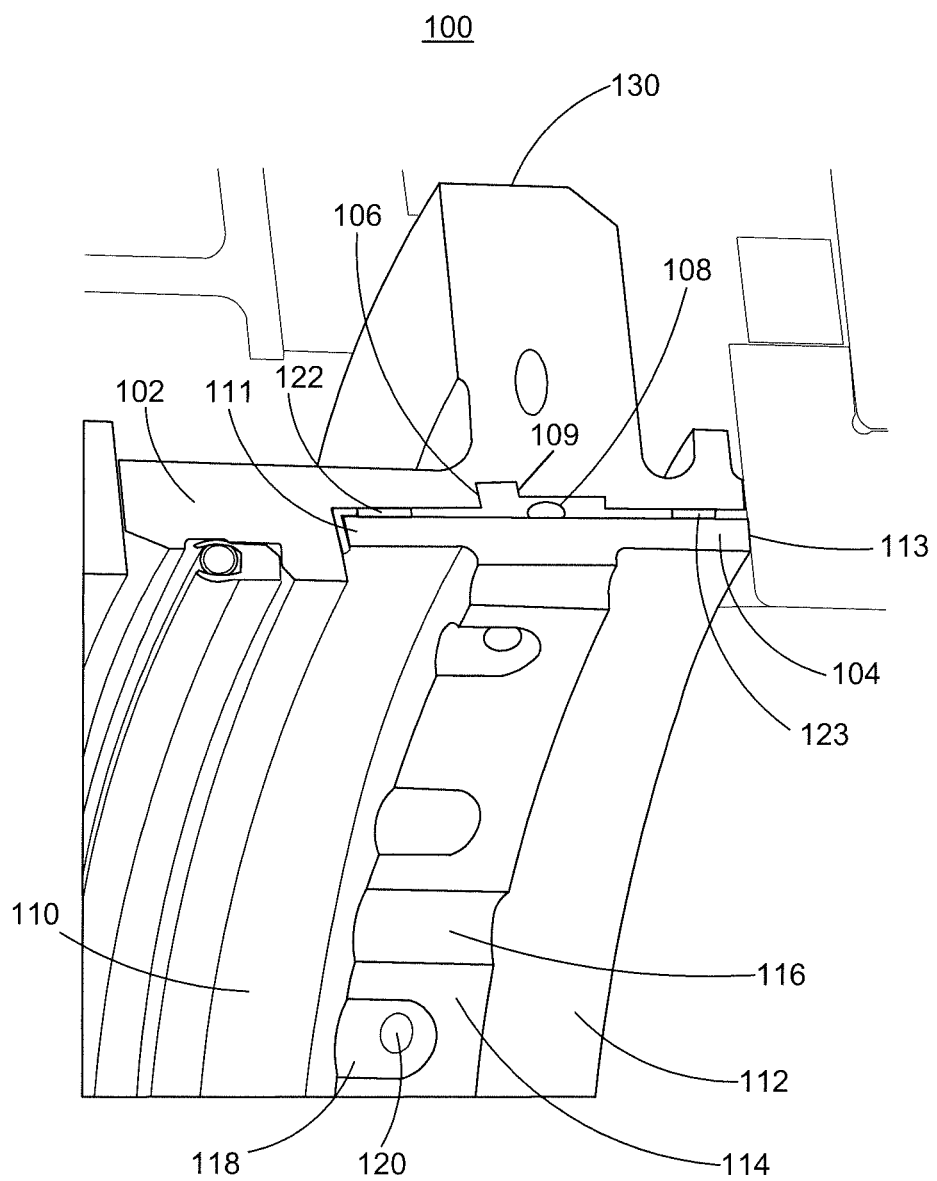
FIG. 2 is a section view of a seal assembly in accordance with the current disclosure.
Figure 4:
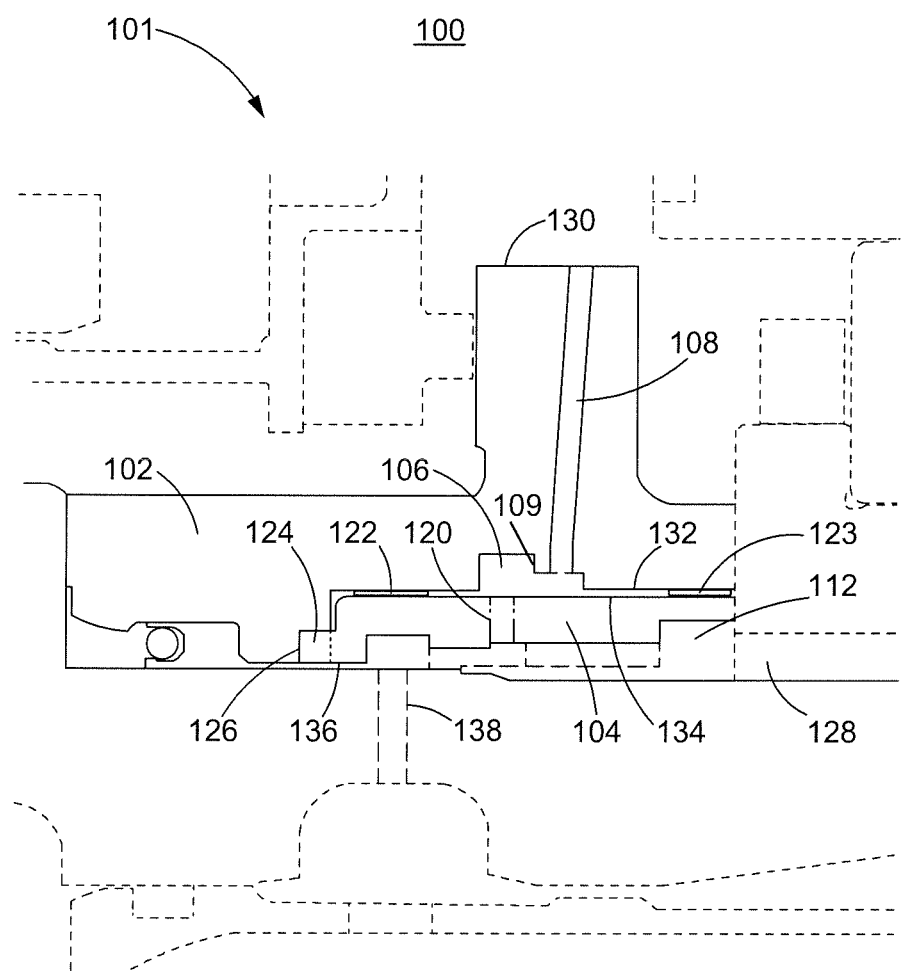
FIG. 4 is a plan view of the seal assembly of FIG. 2.

FIG. 2 illustrates a section view of a seal assembly 100 that may be used in a gas turbine engine 101 (see FIG. 4). The seal assembly 100 includes a seal plate 102 and a sleeve 104. The seal plate 102 may include an annulus 106 and a bore 108 that connects the annulus 106 to an outer wall 130 of the seal plate 102. A dam 109 formed by the annulus 106 allows oil to accumulate or pool to help even distribution of oil to bore 108 and other similar bores used to cool the seal plate 102.

The sleeve 104 may include a first annulus 110 at a front edge 111 of the sleeve 104. The sleeve 104 may also include a second annulus 112 at a rear edge 113 of the sleeve 104. A dam 114 may be formed between the first annulus 110 and the second annulus 112. The dam 114 may include a channel or at least one channel 116 that axially connect the first annulus 110 to the second annulus 112.

An aperture 118 connects the first annulus 110 to a radial hole 120 in the sleeve 104. Unlike the channel 116, the aperture 118 does not connect the first annulus 110 to the second annulus 112. Instead, the aperture 118 connects the first annulus 110 to the radial hole 120.

The channel 116 and aperture 118 may be tapered slightly to encourage the flow of oil axially. The dam 114 allows oil to accumulate or pool in the first annulus 110 to help to ensure even distribution of oil through the channel 116 and the aperture 118.

As illustrated, there may be a number of channels 116 and apertures 118 with corresponding radial holes 120. The number of channels 116 affects the amount of oil that is moved to an adjacent component, such as a bearing. The number of apertures 118 affects the amount of oil that is moved to the seal plate 102 for cooling via the bores 108. The number of channels 116 and apertures 118 may be selected to obtain the desired ratio of flow to the seal plate 102 and a component located adjacent to the second annulus 112.

In terms of manufacturing, the relatively short length of the radial hole 120 makes the alignment of a tool (not depicted) creating the radial hole 120 with the aperture 118 much simpler. In some cases, the short length of the bit needed to make the radial hole 120 may allow the radial hole 120 to be drilled from inside the sleeve 104, making alignment with the aperture 118 extremely straightforward. Similarly, because the bore 108 can penetrate anywhere in the annulus 106, manufacturing of the seal plate 102 is greatly simplified over the prior art seal plate 10, which required precise alignment of the radial hole 14 with the aperture 16.

Further, because the number of bores 108 is independent of the number of radial holes 120, the seal plate 102 can be designed to meet its cooling requirement independently from the design of the sleeve 104. That is, the number of bores 108 is not a function of the number of radial holes 120 in the sleeve 104. Similarly, the ratio of channels 116 to apertures 118/radial holes 120 is independent of the number of bores 108. Thus, the overall number of stocking kits for sleeves 104 and seal plates 102 may be reduced, compared to the integral unit of FIG. 1.

Due to the manner in which the seal plate 102 is constructed and how the sleeve 104 fits inside the seal plate 102, the sleeve 104 is not load bearing with respect to a component stack of engine components that includes the seal plate 102. This allows the sleeve 104 to have more channels 116 and apertures 118/radial holes 120 than would be possible if these structures had to be accommodated in a prior art unitary seal plate 10.

Figure 3:
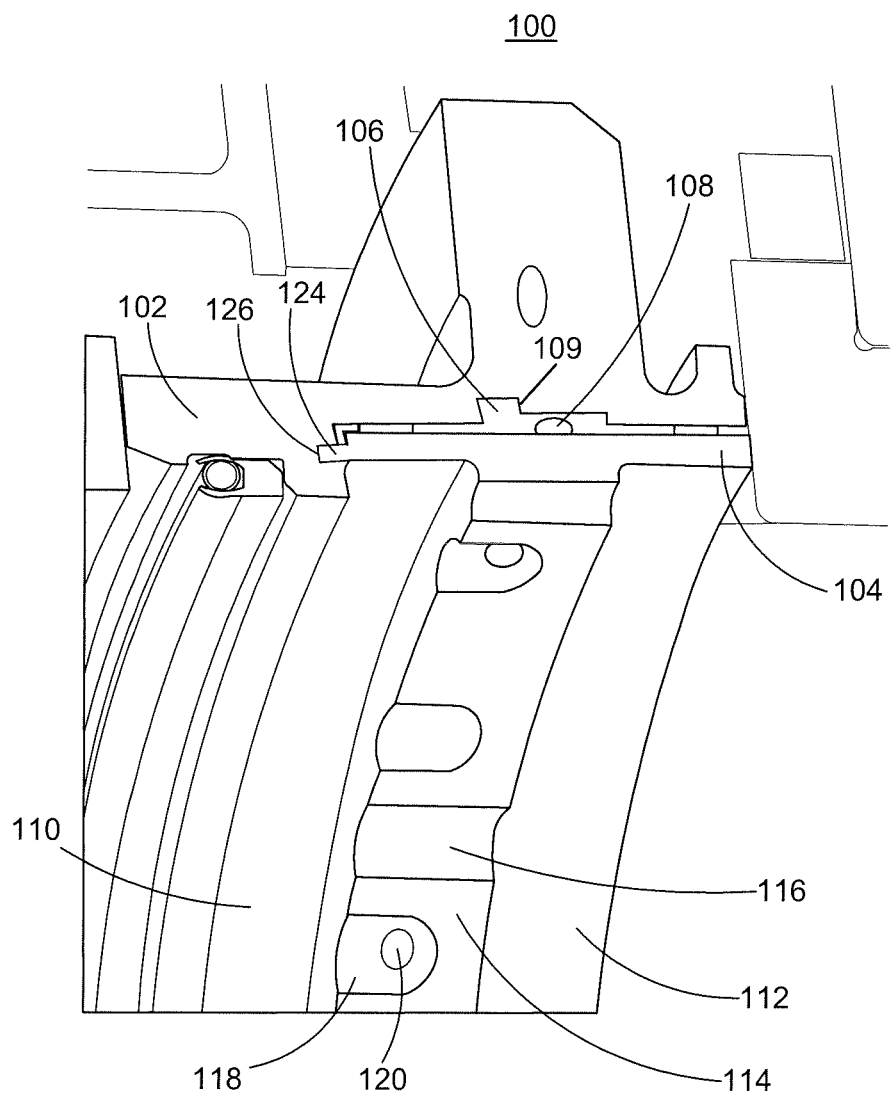
FIG. 3 is a another section view of the seal assembly of FIG. 2.

FIG. 3 is another section view of the seal assembly 100. The section view of FIG. 3 illustrates a tab 124 of the sleeve 104 that is inserted into a slot 126 of the seal plate 102. The tab 124 and slot 126 arrangement may be part of a press-fit assembly process to hold the elements of the seal assembly 100 together and to cause the sleeve 104 to rotate in unison with the seal plate 102 while the gas turbine engine 101 is operating. The sleeve 104 may further comprise one or more tabs 124 configured to engage a corresponding one or more slots 126 in an adjoining component of the seal assembly. The one or more tabs 124 may be disposed on the front edge of the sleeve 104.

FIG. 4 is a cross section of the seal assembly 100. The seal assembly 100 may include seals 122 and 123 to provide a tight radial fit between the sleeve 104 and the seal plate 102. The seals 122 and 123 may minimize unbalance, vibration, fretting, etc., to encourage uniform rotation with the seal plate and shaft, in combination with the tab 124 and slot 126. The seals 122 and 123 or at least one seal may be located at distal portions of the annulus 106 and between an inner wall 132 of the sleeve 104 and an outer wall 134 of the seal plate 102. FIG. 4 also illustrates an inner wall 136 of the sleeve 104. Oil may be supplied by conduit 138 in another adjacent component, such as a shaft. Oil that reaches the second annulus 112 via the channels 116 may flow out of the second annulus 112 through an opening 128 in an adjacent component, such as a bearing.

Figure 5:
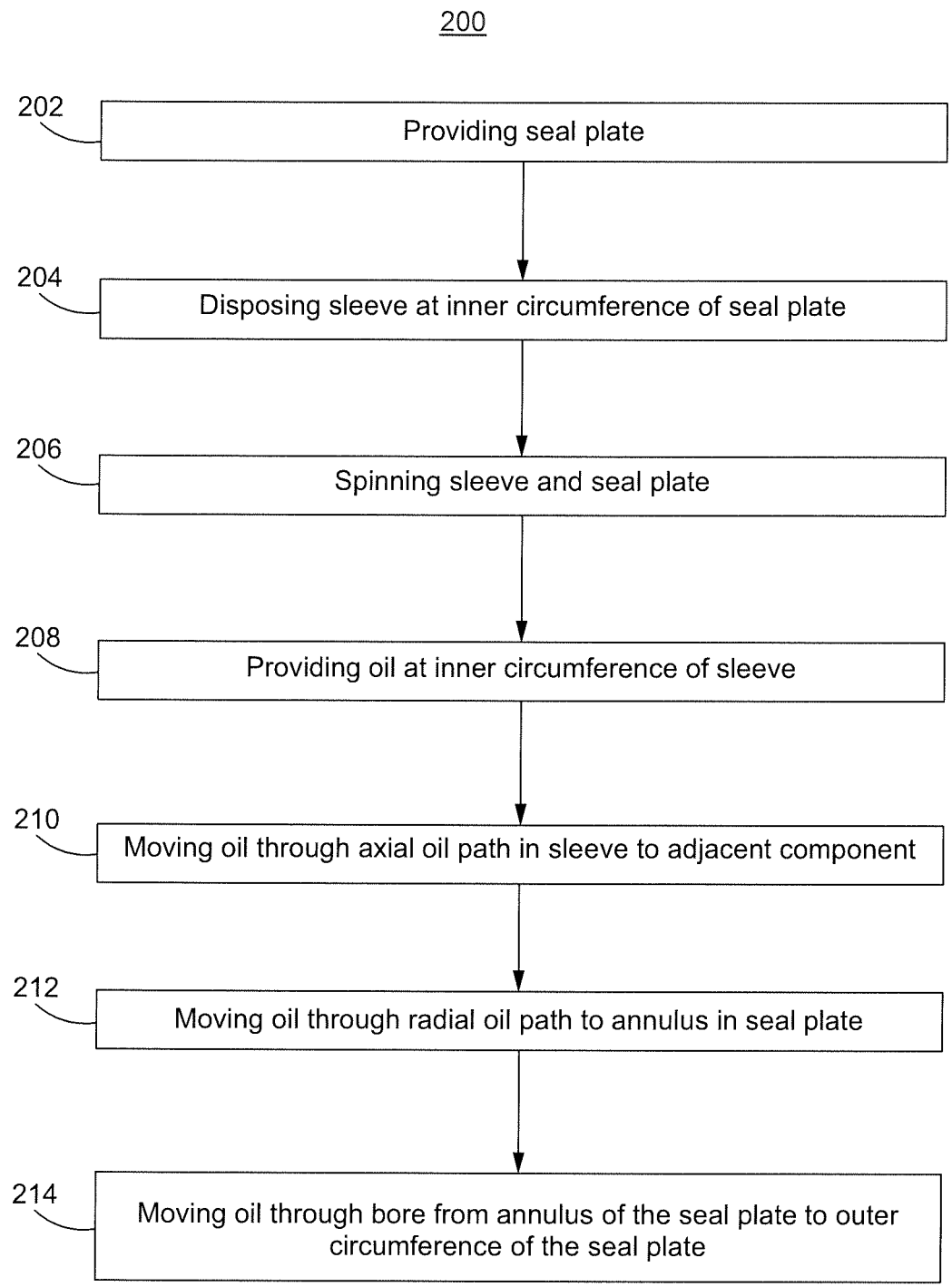
FIG. 5 a flow chart of a method of distributing oil using a seal assembly.

FIG. 5 is a flow chart of a method 200 of distributing oil in a gas turbine engine 101 using a seal assembly 100 including a seal plate 102 and a sleeve 104. At a block 202, the seal plate 102 may be provided. At a block 204, the sleeve 104 may be disposed at an inner wall 132 of the seal plate 102. The sleeve 104 may have an axial oil path 116 and a radial oil path 120. At a block 206, the seal assembly 100 may be rotated during operation of the gas turbine engine. The rotation may, among other effects, cause oil to move through the seal assembly 100. In an embodiment, the seal plate 102 and sleeve 104 may be coupled so that the seal plate 102 and the sleeve 104 move in unison.

At a block 208, oil may be provided at an inner wall 136 or an annulus 110 of the sleeve 104. In an embodiment, the oil may be provided via a conduit 138 in a component of the gas turbine engine. At a block 210, the rotation may also cause oil to move through the axial oil path 116 to an adjoining component of the gas turbine engine 101, such as a bearing.

At a block 212, the rotation may cause oil to move through the radial oil path 120 of the sleeve 104 to an annulus 106 of the seal plate 102. The annulus 106 of the seal plate 102 may be located between an outer wall 134 of the sleeve 104 and the inner wall 132 of the seal plate 102.

At a block 214, oil may be moved by the rotation of the seal assembly 100 through a bore 108 disposed between the annulus 106 of the seal plate 102 and an outer wall 130 of the seal plate 102. The oil moving through the bore 108 may provide cooling to the seal plate 102. In an embodiment, there may be a plurality of axial oil paths 116, radial oil paths 120, and bores 108, although the number of bores 108 in the seal plate 102 can be independent of the number of radial oil paths 120 in the sleeve 104.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A seal assembly for use in a gas turbine engine, the seal assembly comprising:
    a seal plate including:
    an inner wall having an annulus formed therein; and
    a plurality of bores between an outer wall of the seal plate and the annulus; and a sleeve disposed in the annulus of the seal plate, the sleeve having a cylindrical shape with an inner wall, an outer wall, a front edge, and a rear edge, the sleeve including:
    a front annulus around the inner wall adjacent the front edge;
    a rear annulus around the inner wall at the rear edge;
    a dam between the front annulus and the rear annulus formed by a ridge between the front and rear annuli;
    a plurality of channels disposed axially in the dam between the front annulus and the rear annulus;
    a plurality of radial holes in the dam; and
    a plurality of apertures disposed axially in the dam from the front annulus each to a respective one of the plurality of radial holes.

2. The seal assembly of claim 1, wherein the sleeve further comprises a tab that protrudes from the front edge of the sleeve.

3. The seal assembly of claim 2, wherein the seal plate has a slot into which the tab is seated after assembly.

4. The seal assembly of claim 1, further comprising at least one seal disposed between the inner wall of the seal plate and the outer wall of the seal plate.

5. The seal assembly of claim 1, wherein each of the plurality of apertures is shorter than an axial width of the dam.

6. The seal assembly of claim 1, wherein the plurality of channels in the sleeve are proportional to a first volume of oil flow from the front annulus to the rear annulus.

7. The seal assembly of claim 6, wherein the plurality of apertures are proportional to a second volume of oil flow from the front annulus through the plurality of radial holes.

8. The seal assembly of claim 7, wherein a ratio of the plurality of channels to the plurality of apertures defines a proportion of the first volume of oil flow to the second volume of oil flow.

9. The seal assembly of claim 1, wherein the plurality of radial holes in the sleeve are greater than a number of passages between the outer wall of the seal plate and the annulus of the seal plate.

10. A sleeve having a generally cylindrical shape for use in a seal assembly of a gas turbine engine, the sleeve comprising:
    an outer wall, an inner wall, a front edge, and a rear edge, the outer wall configured to be disposed adjacent to an inner wall of a seal plate of the seal assembly;
    a front annulus disposed around the inner wall adjacent the front edge;
    a rear annulus disposed around the inner wall at the rear edge;
    a dam between the front annulus and the rear annulus formed by a ridge between the front and rear annuli; and
    an aperture disposed axially in the dam from the front annulus to a radial hole connecting the aperture and the outer wall of the sleeve.

11. The sleeve of claim 10, further comprising one or more tabs configured to engage a corresponding one or more slots in an adjoining component of the seal assembly.

12. The sleeve of claim 11, wherein the one or more tabs are disposed on the front edge of the sleeve.

13. The sleeve of claim 10, further comprising one or more channels disposed axially in the dam between the front annulus and the rear annulus.

14. A method of distributing oil in a gas turbine engine, the method comprising:
    providing a seal plate;
    disposing a sleeve at an inner wall of the seal plate, the sleeve having an axial oil path and a radial oil path;
    rotating the sleeve and the seal plate during operation of the gas turbine engine; providing oil at an inner wall of the sleeve;
    moving oil through the axial oil path to an adjoining component of the gas turbine engine;
    moving oil through the radial oil path of the sleeve to an annulus of the seal plate, the annulus of the seal plate located between an outer wall of the sleeve and the inner wall of the seal plate; and
    moving oil through a bore disposed between the annulus of the seal plate and an outer wall of the seal plate.

15. The method of claim 14, wherein rotating the sleeve and the seal plate comprises rotating the sleeve in unison with the seal plate.

16. The method of claim 14, further comprising retaining oil in the annulus of the seal plate using seals disposed at distal portions of the annulus.

17. The method of claim 16, wherein each of the seals are in contact with the outer wall of the sleeve and the inner wall of the seal plate.

18. The method of claim 14, wherein the sleeve has a plurality of axial oil paths and a plurality of radial oil paths, the method further comprising moving oil through the plurality of axial oil paths is in proportion to moving oil through the plurality of radial oil paths according to a ratio of a number of the plurality of axial oil paths to a number of the plurality of radial oil paths.

* * * * *